US 6,532,234 B1

(12) United States Patent
Yoshikawa et al.

(10) Patent No.: US 6,532,234 B1
(45) Date of Patent: Mar. 11, 2003

(54) BACK-PRESSURE TYPE ATM SWITCH

(75) Inventors: Suminori Yoshikawa, Tokyo (JP); Kazuhiro Ushiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/107,955

(22) Filed: Jun. 30, 1998

(30) Foreign Application Priority Data

Jul. 1, 1997 (JP) ............................................. 9-175396

(51) Int. Cl.⁷ ............................................. H04L 12/28
(52) U.S. Cl. ...................................................... 370/395
(58) Field of Search ......................... 370/395, 232–236, 370/413–418, 399, 398, 426, 474, 335–342; 709/212, 230–236, 200–204, 100–104; 710/22, 35, 53, 6; 375/146–150

(56) References Cited

U.S. PATENT DOCUMENTS 5,530,695 A * 6/1996 Dighe et al. ................. 370/395
5,796,742 A * 8/1998 Klotzbach et al. ........... 370/466

FOREIGN PATENT DOCUMENTS

| JP | 7-297840 | 11/1995 |
| JP | 8-223173 | 8/1996 |

OTHER PUBLICATIONS

Zheng–Xue Zhao, Shivendra S. Panwar, Don Towsley, "Queueing Performance with Impatient Customers", Mar. 1991, IEEE, vol. 1, pp. 0400–0409.*

M. Shinohara, et al., "Large Scale ATM Switch With Multiple QoS Guarantee", Technical Report of IEICE, SSE96–55, (Aug. 1998), pp. 73–78.

M. Shinohara, et al., "Internal Congestion Control in Large Scale ATM Switch", Technical Report of IEICE, SSE96–131, CQ96–41, (Dec. 1996), pp. 13–18.

* cited by examiner

Primary Examiner—Kwang Bin Yao
Assistant Examiner—Prenell Jones
(74) Attorney, Agent, or Firm—Dickstein, Shapiro, Morin & Oshinsky, LLP.

(57) ABSTRACT

A back-pressure type ATM switch wherein a variety of high-quality and flexible services can be served with high hardware/software efficiency. A resource manager provided to each input buffer, performs rejection control of cells according to RTQL (Rejection Threshold Queue Length) of each of s×n input queues, RTQL of each of s QoS-class virtual resources and a minimum guaranteed resource of each of the s×n input queues referring to RTQL of a common resource. A shaper accompanying each of the s×n input buffers shifts cells into a virtual queue at a speed obtained by (minimum guaranteed speed)+(rate information)×(active VC number of the input queue). A rate controller calculates the rate information as a function of the sum of the virtual queue of each of the s×n input queues of every of the input buffers. A back-pressure connector provided to the input queue read controller of each input buffer defines correspondence between back-pressures generated by output buffers and back-pressures referred to by the input queue read controller.

11 Claims, 8 Drawing Sheets

BACK-PRESSURE TYPE ATM SWITCH

BACKGROUND OF THE INVENTION

The present invention relates to a back-pressure type ATM (Asynchronous Transfer Mode) switch, and particularly to an economical and flexible configuration of the back-pressure type ATM switch for guaranteeing fair throughput making use of an internal rate control.

In conventional back-pressure type ATM switches such as those disclosed in a Japanese patent application entitled "A Method of Priority Control in an Output-buffer Type ATM Switch" and laid open as a Provisional Publication No. 297840/'95, or a Japanese patent application entitled "A Back-pressure Type ATM Switch" and laid open as a Provisional Publication No. 223173/'96, cells toward a congestion node are suspended to be read out from input buffers according to a "back-pressure" signals which are generated at the congestion node in the ATM switch to be fed-back to the input buffers.

FIG. 7 is a block diagram schematically illustrating an example of the back-pressure control applied in a conventional I/O (In/Out) buffer type ATM switch.

In the example of FIG. 7, there are comprised m input buffers 71-1 to 71-m each corresponding to each of m input ports, n output buffers 72-1 to 72-n each corresponding to each of n output ports, and a switch 73 for switching each of cells read out from the input buffers 71-1 to 71-m into one of output buffers 72-1 to 72-n according to header information of the cell (m and n being positive integers).

In each of the input buffers 71-1 to 71-m, s×n input queues (s being an positive integer) are prepared each corresponding to each of s QoS (Quality of Service) classes of cells to be switched to each of the n output buffers 72-1 to 72-n, while s output queues are prepared each corresponding to each of s QoS classes in each of the output buffers 72-2 to 72-m.

From each of the output buffers 72-1 to 72-n, s back-pressures are generated to be fed-back to every of the input buffers 71-1 to 71-m. Each of the s×n back-pressures suspends read-out of cells from corresponding each of s×n input queues of every of the input buffers 71-1 to 71-m, when it is enabled.

Thus, a back-pressure control is realized in the ATM switch of FIG. 7 for obtaining high robustness against instantaneous excessive traffic.

However, according to above back-pressure control, there arise unfair throughputs among the input ports. Consider, for example, only one connection of a certain QoS class toward a certain output port is established in a first input port, while ten connections of the same QoS class toward the same output port are established in a second input port. Then, throughput given for each connection of the second input port becomes 1/10 of that of the first input port, when read-out of cells from concerning two input queues are controlled in the same way, resulting in unfair bandwidth allocation for connections requiring the same QoS among different input ports.

For dealing with this unfair bandwidth allocation, an "internal rate control" is proposed by Shinohara, et al., in "Large Scale ATM Switch with Multiple QoS Guarantee", pp. 73 to 78, TECHNICAL REPORT OF IEICE, SSE96-55 (1996-08), and in "Internal Congestion Contrl in Large Scale ATM Switch", pp. 13 to 18, TECHNICAL REPORT OF IEICE, SSE96-131, CQ96-41 (1996-12). In the internal rate control, an open-loop control is applied to bandwidth guaranteed QoS classes like CBR (Constant Bit Rate) and VBR (Variable Bit Rate) wherein a bandwidth is allocated for each connection, and a closed-loop control according to internal congestion is applied to no bandwidth guaranteed QoS classes like ABR (Available Bit Rate) and UBR (Unspecified Bit Rate).

FIG. 8 is a block diagram schematically illustrating the above closed-loop control applied to the no bandwidth guaranteed QoS classes in a conventional I/O buffer type ATM switch.

For performing the internal rate control, a rate shaper S having a virtual queue (virtual and not depicted in the drawing) is provided for each of n×s input queues, corresponding to each of n output ports and s QoS classes, in each of m input buffers 81-1 to 81-m. In the internal rate control, the rate shaper S virtually reads out cells from its input queue at a rate, or a read-out speed, calculated according to rate information delivered from a rate calculator 84, and the cells read out by the rate shaper S are virtually transferred in the virtual queue to be read out by the read controller when corresponding back-pressure is not enabled.

The rate information is calculated for each of n×s output queues, that is, for each of s QoS class toward each of n output ports, according to queue length of a concerning output queue (hatched output queue 821 of FIG. 8, for example), global queue length, namely, total queue length of every virtual queue (in hatched rate shapers accompanying input queues 811-1 to 811-m, in the example) corresponding to the concerning output queue (821) and cells on a switch 83 toward the concerning output queue (821), and a total number of connections, that is, a sum of active VCs (Virtual Channels) assigned to every input queue (811-1 to 811-m) corresponding to the concerning output queue (821). The read controllers are controlled by back-pressures generated by the switch 83

The rate information defines a read-out speed per a VC, and the rate shaper S shifts cells from the output queue to the virtual queue at a speed calculated by (rate information)× (number of active VCs of the input queue). From every of the virtual queues not suspended by corresponding back-pressure, cells are read out according to rotation priority read-out control (reading out cells from queues in turn).

Thus, fair bandwidth allocation according to closed-loop control is realized for no bandwidth guaranteed QoS classes like ABR and UBR, in the I/O buffer type ATM switch of FIG. 8.

As to bandwidth guaranteed QoS classes like CBR and VBR, an open-loop control, that is, a fixed rate cell-transfer in proportion to the guaranteed bandwidth is performed according to fixed priority read-out control (reading out cells from queues in order of priority).

However, in the above prior art, the fixed rate cell-transfer and the fixed priority read-out control is required for queues assigned to bandwidth guaranteed QoS classes to be open-loop-controlled, while the variable speed rate shaper and the rotation priority read-out control is needed for queues assigned to no bandwidth guaranteed QoS classes to be closed-loop-controlled.

Therefore, for enabling to assign a queue flexibly to any of the bandwidth guaranteed QoS classes and the no bandwidth guaranteed QoS classes, the queue should be prepared with every one of the fixed rate cell-transfer, variable speed rate shaper, fixed priority read-out control and the rotation priority read-out control, which requires large and complicated hardware. In other words, number of QoS classes of the open-loop control and the closed-loop control are both fixed because of hardware restriction, in the above prior art.

Furthermore, a fixed buffer space must be allocated for each of the bandwidth guaranteed QoS classes, and for performing the closed-loop control effectively, certain amount of buffer space must be also allocated for each of no bandwidth guaranteed QoS classes, otherwise the cell rejection rate increases and the acceptable connection number is restricted. Therefore, the number of QoS classes are fixed, efficiency of buffer space is inevitably lowered.

SUMMARY OF THE INVENTION

Therefore, a primary object of the present invention is to provide a back-pressure type ATM switch wherein desired QoS class setting is realized by enabling to assign any queue to any QoS class without needing large hardware. Another object of the invention is to increase the acceptable connection number and decrease the cell rejection rate by improving efficiency of buffer space making use of a common memory.

In order to achieve the object, in a back-pressure type ATM switch of the invention, for switching cells supplied from at least one input port into at least one output port, having input buffers each corresponding to each of said at least one input port and comprising a plurality of input queues, an input queue write controller for performing write control of the cells into the input queues and an input queue read controller for performing read control of the cells buffered in the input queues according to back-pressures, output buffers each corresponding to each of said at least one output port and comprising a plurality of output queues, an output queue write controller for performing write control of the cells into the output queues and generating the back-pressures and an output queue read controller for performing read control of the cells buffered in the output queues, and a switch for switching the cells read out from the input buffers into the output buffers according to header information of the cells; each of the input buffers further comprises:

a resource manager for performing rejection control of the input queue write controller according to minimum guaranteed resources and rejection threshold queue length defined for each of the input queues, each of QoS-class virtual resources, and a common resource;

each of the minimum guaranteed resources indicating a buffer space to be used exclusively by each of the input queues;

the rejection threshold queue length defined for each of the input queues indicating maximum allowable queue length of each of the input queues;

the rejection threshold queue length defined for each of QoS-class virtual resources indicating maximum allowable queue length of each of QoS-class virtual resources, each of the QoS-class virtual resources representing a sum of certain of the input queues which are assigned to each of QoS classes defining service levels of the back-pressure type ATM switch; and the rejection threshold queue length defined for the common resource indicating a buffer space to be used commonly by each of the input queues.

In the back-pressure type ATM switch;

the rejection threshold queue length defined for the common resource is given by reducing all of the minimum guaranteed resources from a total buffer space allocated to said each of the input buffers;

any of the cells is rejected when queue length of one of the input queues wherein said any is to be buffered is not shorter than the rejection threshold queue length defined to said one;

any of the cells is rejected when queue length of one of the QoS-class virtual resources wherein said any is to be sorted is not shorter than the rejection threshold queue length defined to said one of the QoS-class virtual resources; and any of the cells is rejected when queue length of the common resource is not shorter than the rejection threshold queue length defined to the common resource, and queue length of one of the input queues wherein said any is to be buffered is not shorter than corresponding one of the minimum guaranteed resources.

Therefore, a dynamic and efficient memory allocation is enabled in the invention together with flexible setting of rejection service levels.

The back-pressure type ATM switch further comprises:

shapers each accompanying to each of the input queues of each of the input buffers for shifting cells from said each of the input queues to a virtual queue from where the cells are read out by the input queue read controller at a speed obtained by adding a minimum guaranteed speed to a product of rate information designated to said each of the input queues and a number of active VCs assigned to said each of the input queues; and a rate controller for calculating the rate information to be designated for each of the input queues of every of the input buffers according to a function of a sum of queue length of the virtual queue of said each of the input queues of every of the input buffers and a sum of a number of active VCs assigned to said each of the input queues of every of the input buffers.

Therefore, setting of a desired variety of bandwidth service levels is enabled with the same queue configuration throughout from the bandwidth guaranteed QoS classes like CBR/VBR to the no bandwidth guaranteed QoS classes like ABR/UBR.

Still further, each of the input buffers of the back-pressure type ATM switch comprises a back-pressure connector provided to the input queue read controller for defining correspondence between second back-pressures to be referred to by the input queue read controller and the back-pressures generated by the output queue write controller of every of the output buffers.

Therefore, setting of a desired delay priority order is enabled independent of the bandwidth service level with no restriction between numbers of QoS classes in the input buffer and the output buffer.

Thus, a variety of high-quality and flexible services can be served with high hardware/software efficiency, according to the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
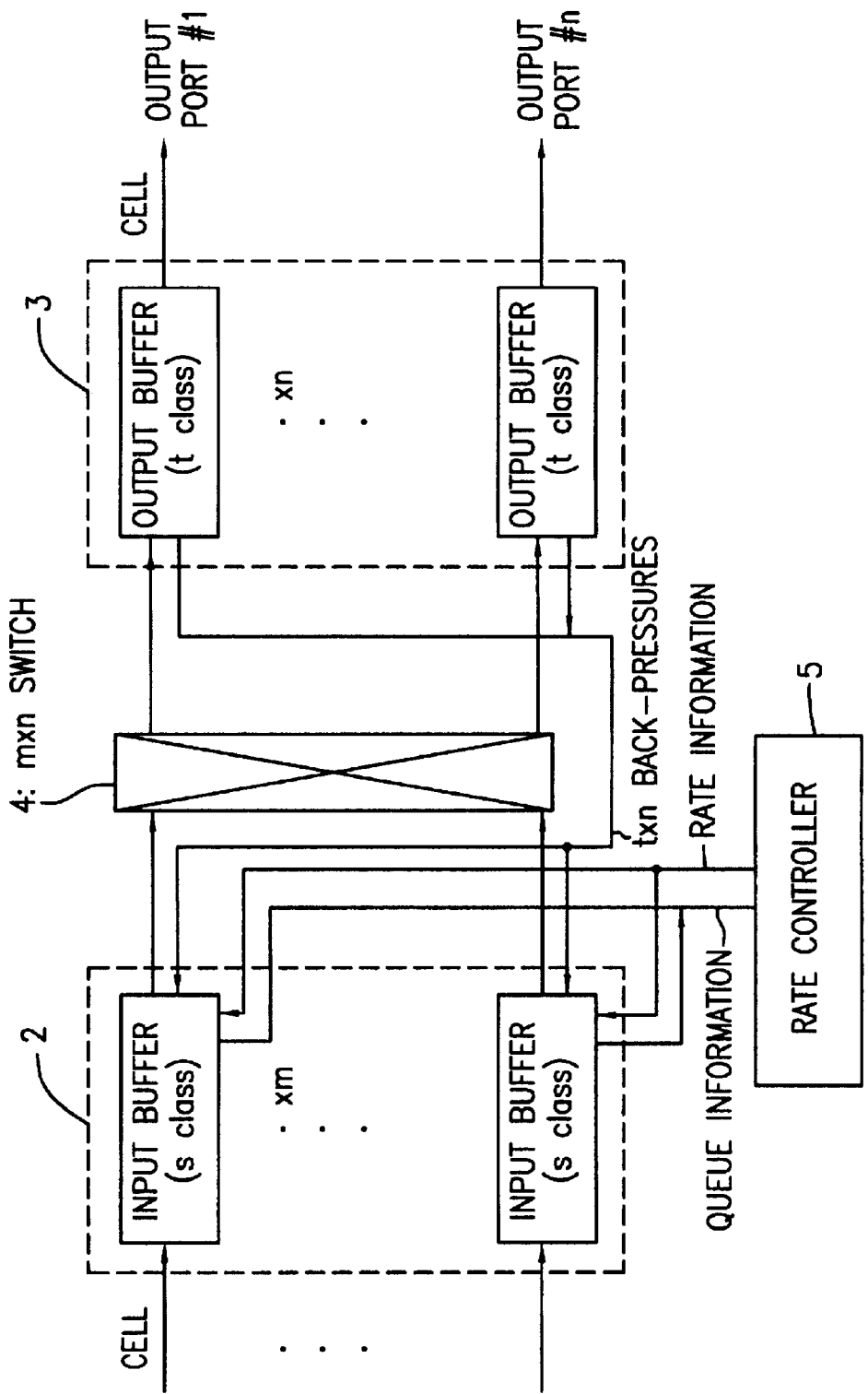
FIG. 1 is a block diagram illustrating a back-pressure type ATM switch according to an embodiment of the invention.

FIG. 1 is a block diagram illustrating a back-pressure type ATM switch according to an embodiment of the invention.

The back-pressure type ATM switch of FIG. 1 comprises an input buffer section 2 having m input buffers, an output buffer section 3 having n output buffers, a switch 4 having m×n ports, and a rate controller 5. In the input buffer section 2, s QoS classes are served, and t QoS classes are served in the output buffer section 3 (m, n, s, and t being positive integers).

Figure 2:
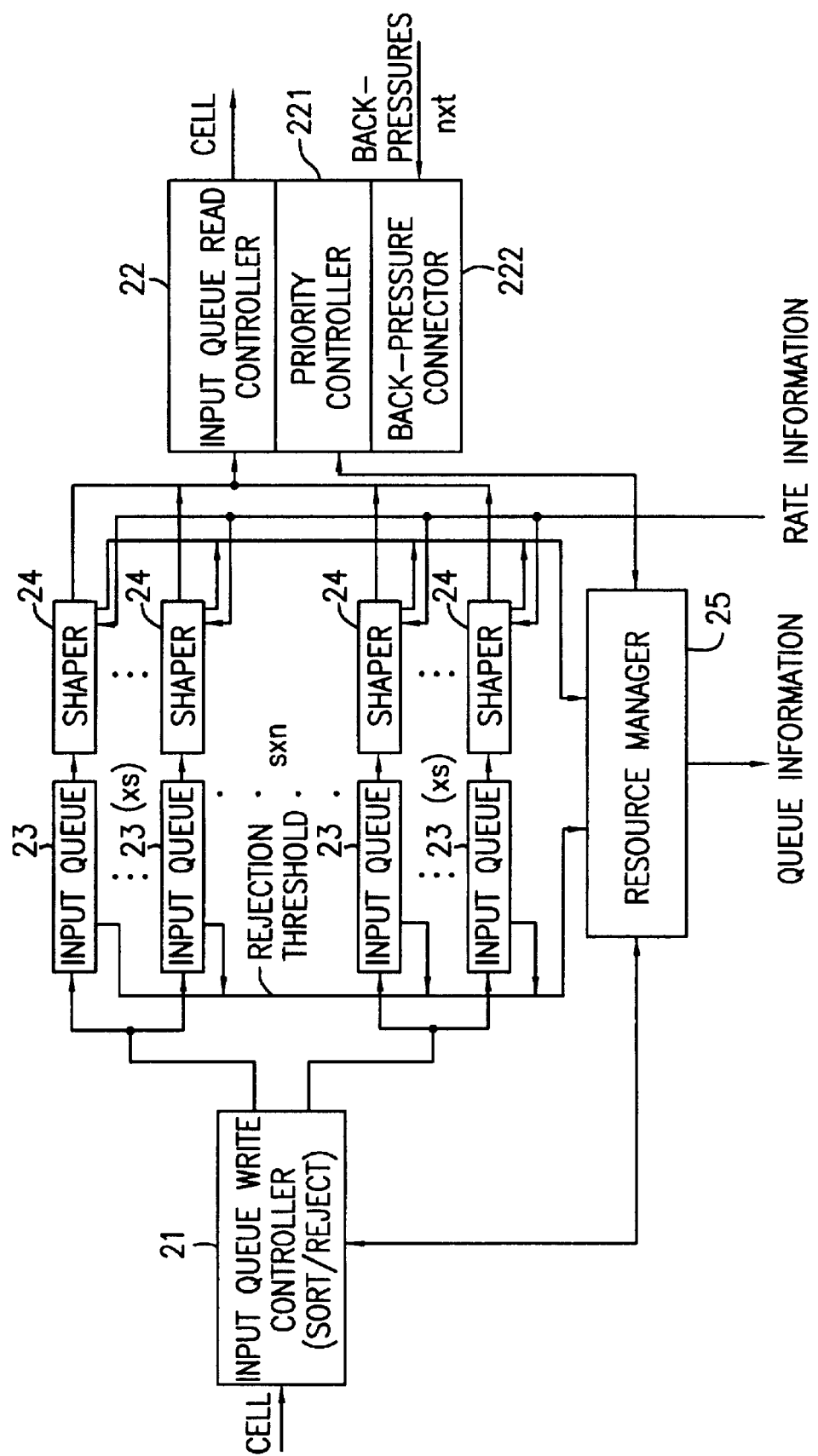
FIG. 2 is a block diagram illustrating a configuration of each of the m input buffers of FIG. 1.

FIG. 2 is a block diagram illustrating a configuration of each of the m input buffers, comprising an input queue write controller 21, an input queue read controller 22 having a back-pressure connector 222 and a priority controller 221 for performing rotation priority read-out control of the input queue read controller 22, s×n sets of an input queue 23 and a shaper 24 including a virtual queue, and a resource manager 25. Queue information of each input queue 23 including an active VC number thereof and corresponding virtual queue length is sent to the rate controller 5 through the resource manager 25 of each of the m input buffers, and rate information from the rate controller 5 is served to each of the shapers 24 for defining a variable term per a VC of a read-out speed of each of the shapers 24.

Figure 3:
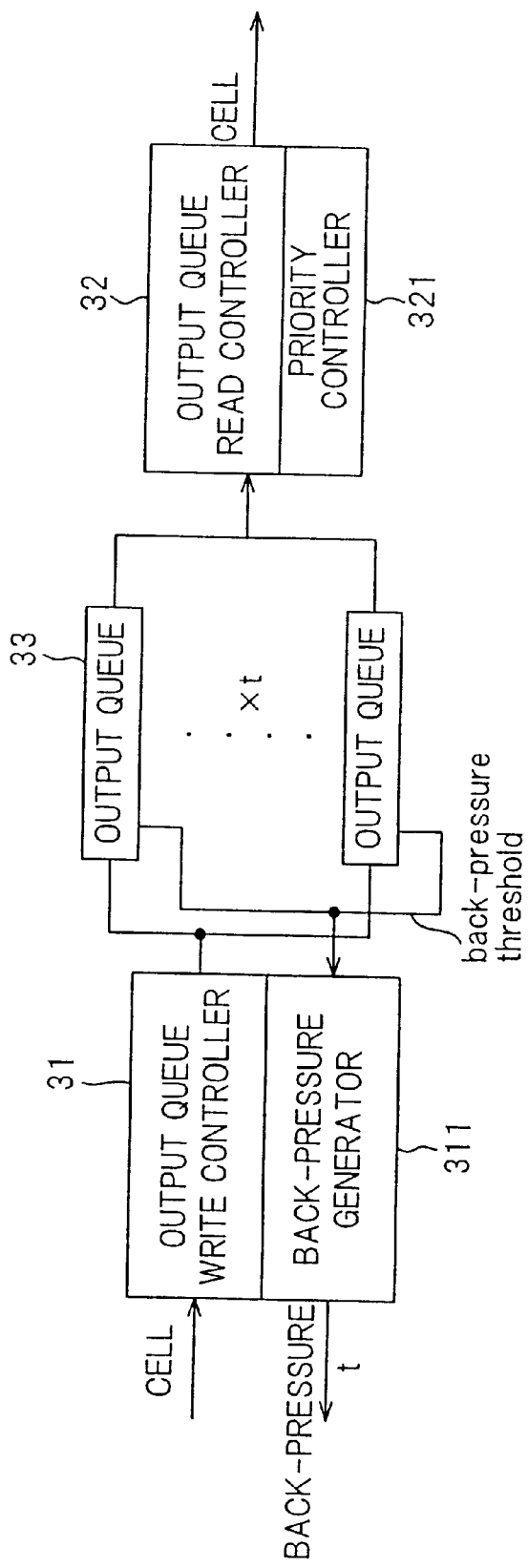
FIG. 3 is a block diagram illustrating a configuration of each of the n output buffers of FIG. 1.

FIG. 3 is a block diagram illustrating a configuration of each of the n output buffers, comprising an output queue write controller 31, an output queue read controller 32 and t output queues 33. The output queue write controller 31 of each of the n output buffers generates t back-pressures, and t×n back-pressures are all supplied to the back-pressure connector 222 of the input queue read controller 22 of every of the m input buffers.

Figure 4:
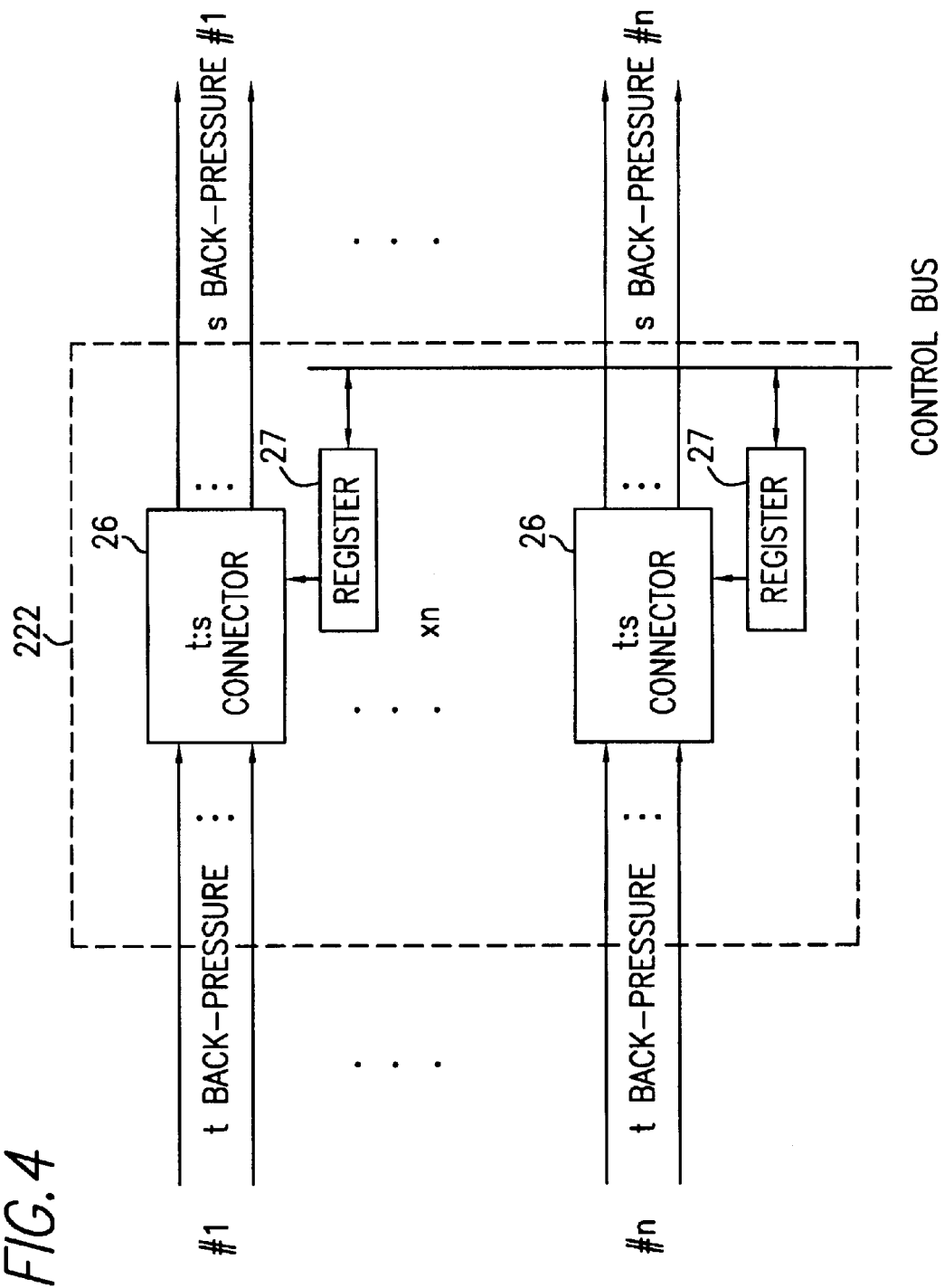
FIG. 4 is a block diagram illustrating the buck-pressure connector 222 of FIG. 2.

FIG. 4 is a block diagram illustrating the back-pressure connector 222, comprising n sets of a register 27 and a t:s connector 26. In each set, t back-pressures generated by the output queue write controller 31 are connected to s back-pressures to be supplied to the input queue write controller 21 according to logic of the register 27, in such a manner that each of the t back-pressures is connected to at least one of the s back pressures and each of the s back-pressures is connected to at least one of the t back-pressures. Therefore, a desired number (s) of input queues 23 of each of the m output buffers can be set to correspond to a desired number (t) of output queues 33 of each of the n output buffers.

The m input buffers in the input buffer section 2 share a common memory, whereof conception is described in the following paragraphs referring to FIGS. 5 and 6.

Figure 5:
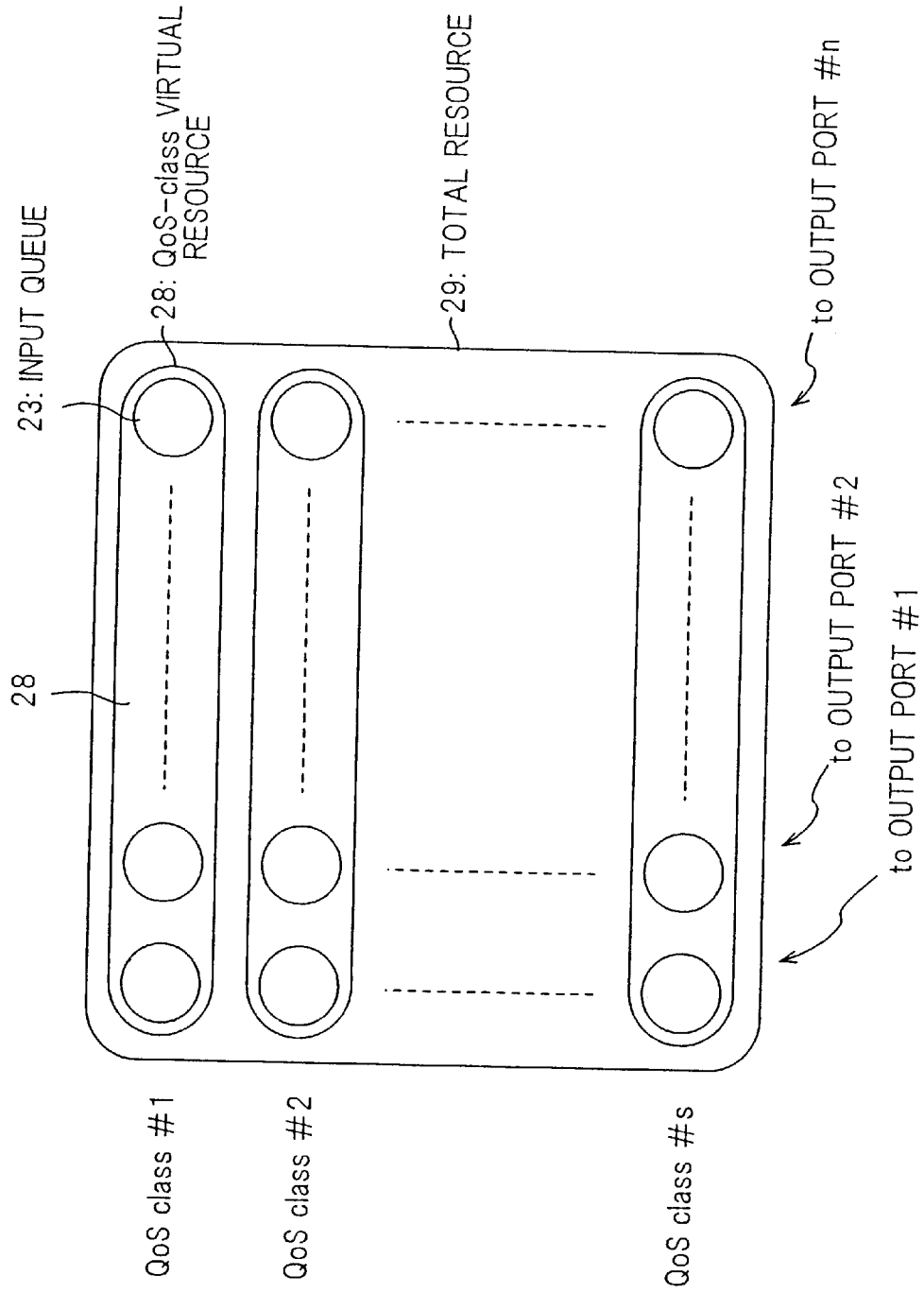
FIG. 5 is a schematic diagram illustrating conception of resources managed by the resource manager 25 of FIG. 2.

FIG. 5 is a schematic diagram illustrating conception of resources managed by the resource manager 25 of each of the m input buffers. In each of the m input buffers, there are provided s×n input queues 23 corresponding to s QoS classes and n output ports. For managing total input queue length of each of the s QoS classes toward all of the n output port, s QoS-class virtual resources 28 are defined, and a total resource 29 is defined for managing total input queue length of all of the s QoS classes toward all of the n output ports, for each of the m input buffers.

Initially, each minimum guaranteed buffer space is allocated for each of the s QoS-class virtual resources, and therefore, (the total resource 39)–Σ(minimum guaranteed buffer space) gives the common memory to be shared, which is hereafter called a common resource. The usage of the common resource by input queues 23 in an input buffer is controlled by defining rejection threshold queue length (hereafter abbreviated as RTQL) of each of the s×n input queues 23, RTQL of each of s QoS-class virtual resources 28, and RTQL of the common resource. An example of allocation of the RTQL for QoS-class (#1 to #6) virtual resources 28 is shown in FIG. 6.

Now, operation of the back-pressure type ATM switch according to the embodiment is described referring to FIGS. 1 to 5.

When a cell arrives to an input buffer, the input queue write controller 21 detects an output port whereto the cell is to be switched and a QoS class whereby the cell is to be served in the input buffer referring to header information of the cell, and notifies information of the output port and the QoS class to the resource manager 25. The resource manager 25 determines whether the cell is to be rejected or not by referring to actual states of the corresponding input queue 23, the corresponding QoS-class virtual resources 28, and the common resource, When queue length of either of the corresponding input queue 23 or the corresponding QoS-class virtual resource 28 is not shorter than its RTQL, the input queue write controller 21 is indicated to reject the cell by the resource manager 25. When queue length of the common resource, namely, a number of cells using the common resource is not shorter than its RTQL and queue length of the corresponding input queue 23 is not shorter than its minimum guaranteed resource (described afterwards), the cell is rejected too. Otherwise, the cell is accumulated in corresponding one of the s×n input queues 23.

Thus, cells flowing in through an input port are buffered in the input queues 23 of the respective input buffer.

In the following paragraphs, the memory allocation and the rejection control performed in each of the m input buffers is described referring to FIGS. 5 and 6.

Figure 6:
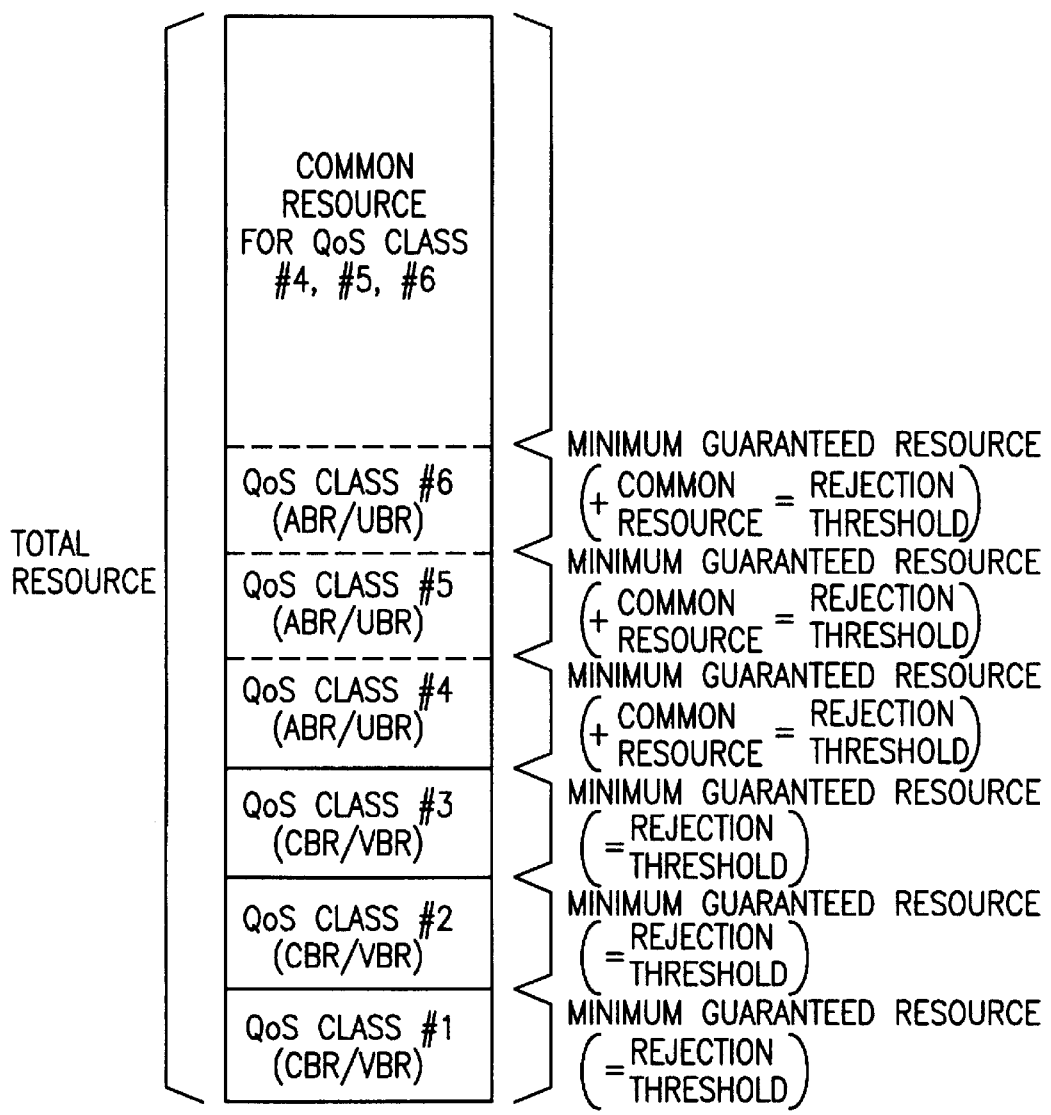
FIG. 6 is a schematic diagram illustrating an example of the memory allocation according to the embodiment.
Figure 7:
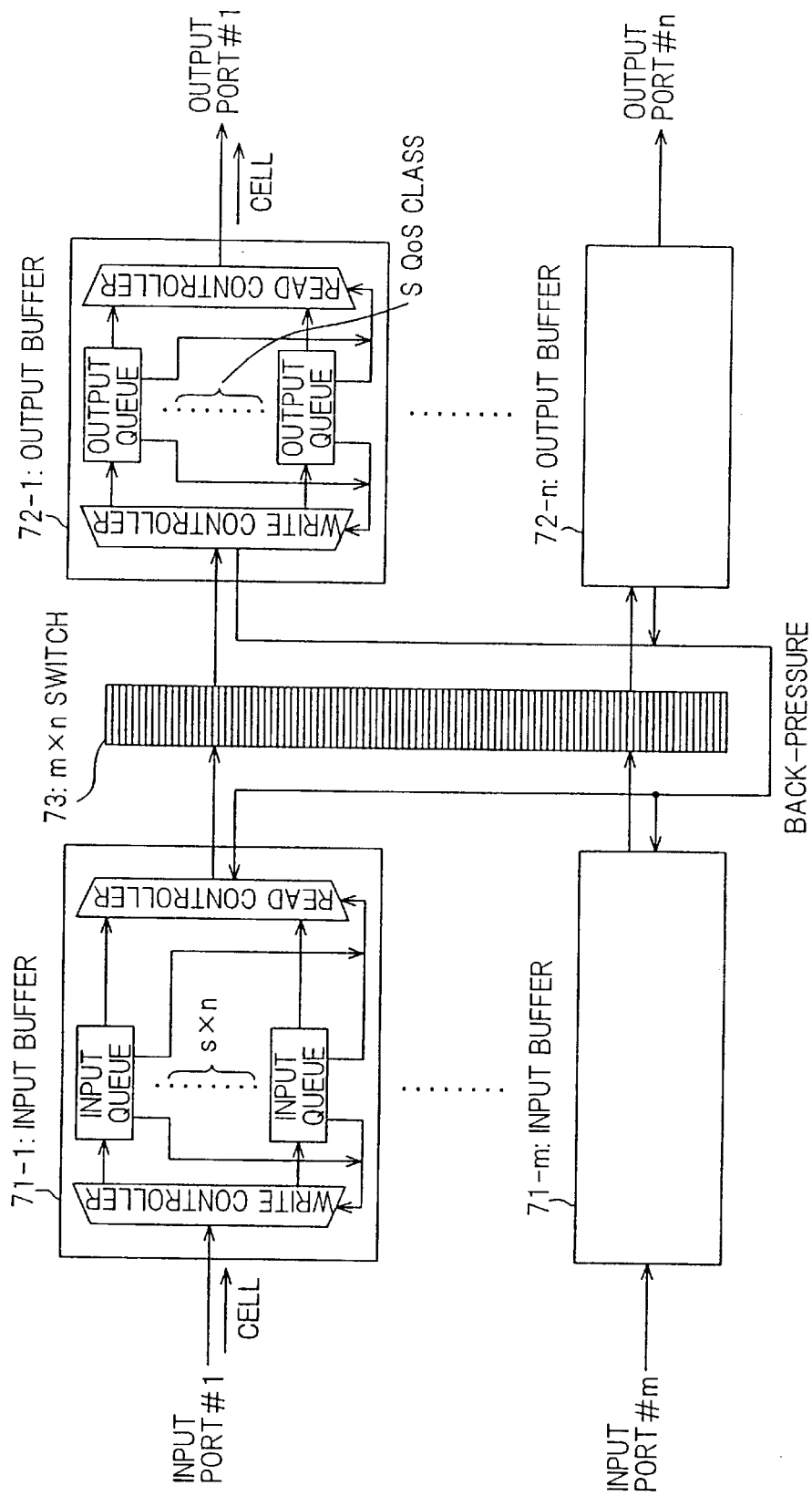
FIG. 7 is a block diagram schematically illustrating an example of the back-pressure control applied in a conventional I/O buffer type ATM switch.
Figure 8:
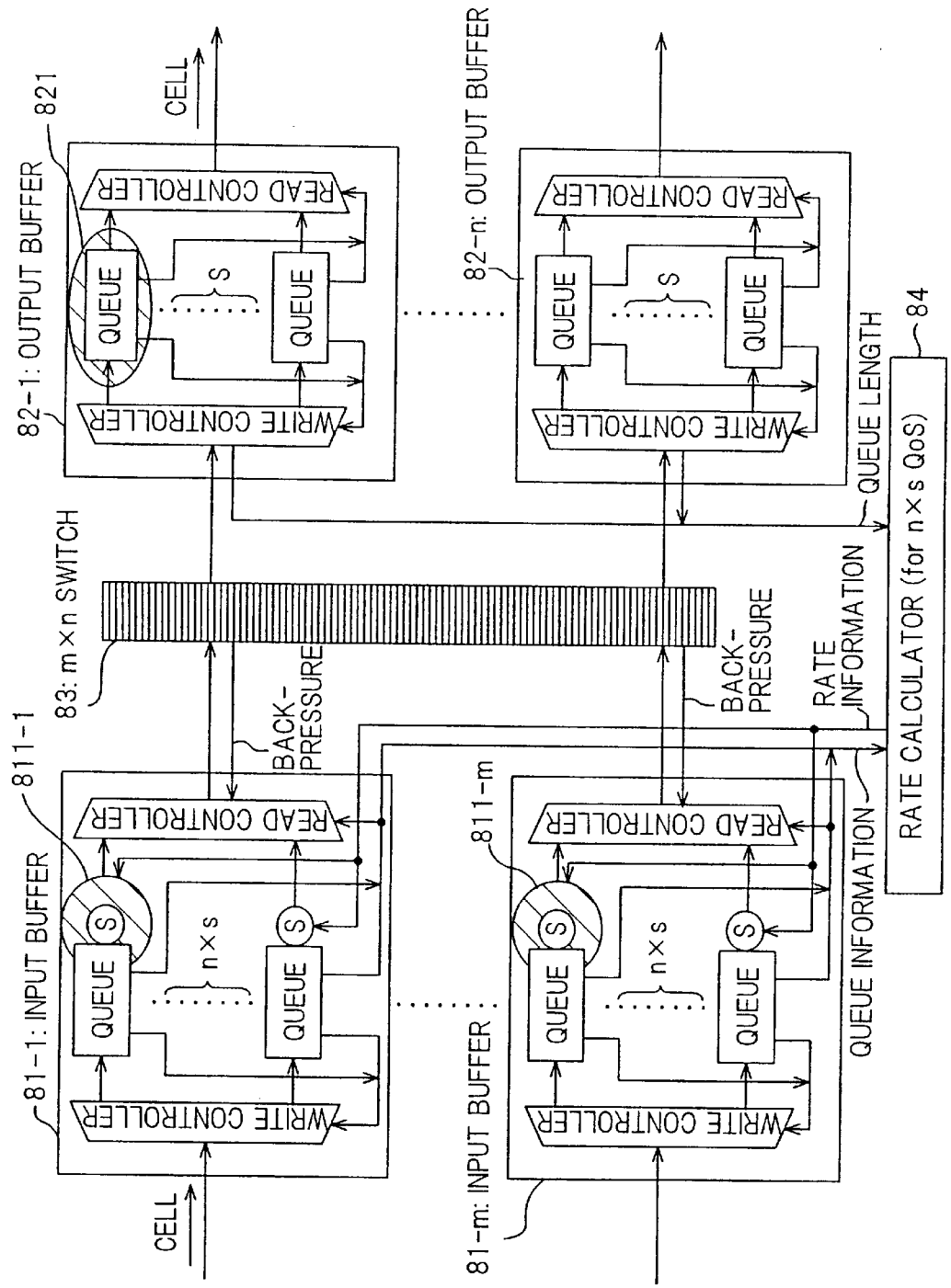
FIG. 8 is a block diagram schematically illustrating closed-loop control applied to the no bandwidth guaranteed QoS classes in another conventional I/O buffer type ATM switch.

FIG. 6 is a schematic diagram illustrating an example of the memory allocation according to the embodiment. The memory allocation of each of the m input buffers is substantially performed by defining a RTQL for each of the s×n input queues 23, for each of the s QoS-class virtual queues 28 and for the common resource.

In the example of FIG. 6, there are served six QoS classes #1 to #6. A system manager of the ATM switch determines a total resource 29 to be allocated for each of the m input buffer, considering cell flow of each input port, cell interval fluctuation, operational delay in the ATM switch, etc., for example.

For each of input queues 23 to be assigned to VCs of bandwidth guaranteed QoS classes (#1 to #3) like CBR/VBR, a minimum guaranteed resource is defined considering its guaranteed bandwidth, etc., and a minimum guaranteed resource is also defined for each of input queues 23 to be assigned to VCs of no bandwidth guaranteed QoS classes (#4 to #6) like ABR/UBR considering its service level, etc., in the embodiment. Each of the minimum guaranteed resources "QoS class #1" to "QoS class #6" of FIG. 6 represents a sum of the minimum guaranteed resources defined for input queues 23 of the respective QoS class, which composes the minimum guaranteed resource defined for the respective QoS-class virtual resource 28, and a common resource CR is calculated by $$CR = (\text{the total resource}) - \sum_{i=1}^{S} (\text{QoS class } \#I).$$

As to bandwidth guaranteed QoS classes (#1 to #3), RTQL (RTQL-$Q_{ij}$; i=1, 2 or 3, in the example, and $1 \leq j \leq n$) of each of the input queues 23, and RTQL (RTQL-$V_i$; i=1, 2 or 3 in the example) of each of the QoS-class virtual resources 28 is defined to be equal to its respective minimum guaranteed resource, for example.

On the other hand, as to no bandwidth guaranteed QoS classes (#4 to #6), RTQL (RTQL-$Q_{ij}$; i=4, 5 or 6, and $1 \leq j \leq n$) of each of the input queues 23, and RTQL (RTQL-$V_i$; i=4, 5 or 6) of each of the QoS-class virtual resources 28 is defined to be (its respective minimum guaranteed resource)+CR, for example, and RTQL (RTQL-C) of the common resource is defined to be length of the common resource CR itself. When queue length of the common resource is not shorter than the RTQL-C, only input queues whereof queue length is shorter than their minimum guaranteed resources are admitted to accept the cells, by the resource manager 25.

Therefore, by defining each RTQL appropriately, a dynamic and efficient memory allocation is realized in the embodiment.

Further, in the above example, RTQL-$Q_{ij}$ is described to be $\Sigma_j \text{RTQL-}Q_{ij} = \text{RTQL-}V_i$ for the guaranteed bandwidth QoS classes. In the case, cell concurrence in the output queues 33 can be prevented. However, it may be defined as $\Sigma_j \text{RTQL-}C_{ij} > \text{RTQL-}V_i$, for preventing under-flow of the output queues 33. And further, the common resource may be shared also by the guaranteed bandwidth QoS classes, by defining RTQL-$V_i$ larger than minimum guaranteed resources, for example.

On the contrary, RTQL-$V_i$ for the no bandwidth guaranteed QoS classes may be smaller than (respective minimum guaranteed resource)+CR. Still further, zero may be defined as the minimum guaranteed resources for certain of the s×n input queues 23.

Thus, a desired variety of rejection service levels can be set in the embodiment, by defining the minimum guaranteed resource and the RTQL appropriately for each input queue 23 or each QoS-class virtual resource 28, enabling to provide flexible services according to users' needs.

Returning to FIGS. 1 and 2, queue length of each input queues 23 is reported to the resource manager 25 for enabling above rejection control. The cells accumulated in the input queue 23 are shifted to the virtual queue by the shaper 24, one by one in FIFO (First In First Out). Here, it is to be noted that the cells are shifted virtually and the queue length to be reported to the resource manager 25 to be compared to each RTQL doesn't vary by the shift. On the contrary, queue length in the virtual queue itself is notified to the resource manager 25 and reported to the rate controller 5 of FIG. 1 as the queue information together with the number of active VCs using each input queue 23.

The rate controller 5 calculates rate information, namely, a variable term per a VC of the read-out speed for each of s QoS classes toward each of n output ports as a function of total queue length of corresponding m virtual queues 24 and total active VC number of corresponding input queues 23, so that the variable term is reduced when the total virtual queue length becomes long. The function may be determined differently for each QoS class. For example, the variable term may be zero for the bandwidth guaranteed QoS classes.

Each of the s×n variable terms thus calculated by the rate controller 5 is delivered to corresponding m shapers 24 of m input buffers as the rate information. The shaper 24 shifts the cells from the input queue 23 into the virtual queue at a speed calculated as (minimum guaranteed speed)+(rate information)×(active VC number of the input queue 23). The minimum guaranteed speed may be determined desirably for each QoS class. For example, the minimum guaranteed speed is preferably the same with a sum of guaranteed bandwidth of all active VCs for the bandwidth guaranteed QoS classes.

Then, the input queue read controller 22 of each input buffer reads out cells from each of the s×n virtual queues with the rotation priority read-out control controlled by the priority controller 221 according to back-pressures delivered from the back-pressure connector 222, that is, reads out cells one by one in turn from every of virtual queues on condition that there is left any cell in the virtual queue and that the back-pressure corresponding to the virtual queue is not enabled.

The cells read out by the input queue read controller 32 of each of the m input buffers are switched by the switch 4 into each of the n output buffers and buffered in one of the t output queues 33 sorted by the output queue write controller 31 of FIG. 3 of each of the n output buffers according to header information of the cells.

The cells in each of the t output queues 33 are read out by the output queue read controller 32 with the fixedly priority read-out control, that is, in order to priority assigned to each of the t output queues 33, controlled by the priority controller 321, to be output to respective output port.

For each of the t output queues 33, a back-pressure threshold length is defined and when queue length of an output queue 33 becomes longer than its back-pressure threshold length, it is notified to the back pressures for suspending read-out of corresponding cells from every of the m input buffers.

Thus, any set of the input queue 23 and the shaper 24 can be assigned to any of a desired variety of QoS classes with the same hardware/software configuration, in the embodiment, by appropriately preparing parameters such as the RTQL, the minimum guaranteed speed, the function for defining the rate information or the back-pressure threshold length of the output queue.

Furthermore, the input queue read controller 22 of each input buffer is provided with the priority connector 221 having a configuration as previously described referring to FIG. 4 for defining correspondence between the t back-pressures generated by the back-pressure generator 311 of each of the n output buffers and the s back-pressures for controlling read-out of cells in s virtual queues to be switched to said each of n output buffers, according to logic of each registers 27.

When one of the s back-pressure is connected to more than one of the t back-pressure, said one of the s back-pressure is enabled according to OR logic of said more than one of the t back-pressure, while more than one of the s back-pressure are all enabled by logic of one of the t back-pressures when said more than one of the s back-pressure are connected to said one of the t back-pressures.

Therefore, the system manager can prepare any number (s) of input QoS classes corresponding to any number (t) of output QoS classes by controlling logic of each of the registers 27. In other words, delay priority order of each of the input QoS classes can be set desirably independent of bandwidth service level of said each of the input QoS classes, in the embodiment, by way of the t output queues read out according to the fixed priority read-out control.

As heretofore described, by providing the resource manager 25 to the input buffer for performing rejection control of cells to be buffered in the input buffer according to RTQL of each of the s×n input queues 23, RTQL of each of the s QoS-class virtual resources 28 and the minimum guaranteed resource of each of the s×n input queues 23 referring to RTQL of the common resource, a dynamic and efficient memory allocation is enabled in the invention together with flexible setting of rejection service levels.

Further, by providing a shaper 24 for each of the s×n input buffers 23 for shifting cells into a virtual queue at a speed obtained by (minimum guaranteed speed)+(rate information)×(active VC number of the input queue 23), and a rate controller 5 for calculating the rate information for each of the s QoS classes toward each of the n output ports, setting of a desired variety of bandwidth service levels is enabled with the same queue configuration throughout from the bandwidth guaranteed QoS classes like CBR/VBR to the no bandwidth guaranteed QoS classes like ABR/UBR.

Still further, by providing a back-pressure connector 222 connected to the input queue read controller 22 of each input buffer, setting of a desired delay priority order is enabled independent of the bandwidth service level with no restriction between numbers of QoS classes in the input buffer and the output buffer.

Therefore, a variety of high quality and flexible services can be served with high hardware/software efficiency, according to the invention.

What is claimed is:

1. A back-pressure type ATM (Asynchronous Transfer Mode) switch, for switching cells supplied from at least one input port into at least one output port, comprising:
input buffers each corresponding to each of said at least one input port and comprising a plurality of input queues, an input queue write controller for performing write control of the cells into the input queues and an input queue read controller for performing read control of the cells buffered in the input queues according to back-pressures;
output buffers each corresponding to each of said at least one output port and comprising a plurality of output queues, an output queue write controller for performing write control of the cells into the output queues and generating the back-pressures and an output queue read controller for performing read control of the cells buffered in the output queues;
and a switch for switching the cells read out from the input buffers into the output buffers according to header information of the cells; each of the input buffers further comprising:
a resource manager for performing rejection control of the input queue write controller according to minimum guaranteed resources and a rejection threshold queue length defined for each of the input queues, each of QoS-class (Quality of Service class) virtual resources, and a common resource;
each of the minimum guaranteed resources indicating a buffer space to be used exclusively by each of the input queues;
the rejection threshold queue length defined for each of the input queue indicating maximum allowable queue length of each of the input queues;
the rejection threshold queue length defined for each of QoS-class virtual resources indicating maximum allowable queue length of each of QoS-class virtual resources, each of the QoS-class virtual resources representing a sum of certain of the input queues which are assigned to each of QoS classes defining service levels of the back-pressure type ATM switch; and
the rejection threshold queue length defined for the common resource indicating a buffer space to be used commonly by each of the input queues.

2. A back-pressure type ATM switch as recited in claim 1; wherein:
the rejection threshold queue length defined for the common resource is given by reducing all of the minimum guaranteed resources from a total buffer space allocated to said each of the input buffers;
any of the cells is rejected when queue length of one of the input queues wherein said any is to be buffered is not shorter than the rejection threshold queue length defined to said one;
any of the cells is rejected when queue length of one of the QoS-class virtual resources wherein said any is to be sorted is not shorter than the rejection threshold queue length defined to said one of the QoS-class virtual resources; and
any of the cells is rejected when queue length of the common resource is not shorter than the rejection threshold queue length defined to the common resource, and queue length of one of the input queues wherein said any is to be buffered is not shorter than corresponding one of the minimum guaranteed resources.

3. A back-pressure type ATM switch as recited in claim 2; wherein:
the rejection threshold queue length defined for each of the input queues is set to be equal to corresponding one of the minimum guaranteed resources when said each is assigned to a bandwidth guaranteed QoS class, and equal to a sum of the common resource and corresponding one of the minimum guaranteed resources when said each is assigned to a no bandwidth guaranteed QoS class; and
the rejection threshold queue length defined for each of the QoS-class virtual queues is set to be equal to a sum of corresponding certain of the minimum guaranteed resources when said each is assigned to a bandwidth guaranteed QoS class, and equal to a sum of the common resource and corresponding certain of the minimum guaranteed resources when said each is assigned to a no bandwidth guaranteed QoS class.

4. A back-pressure type ATM switch, for switching cells supplied from at least one input port into at least one output port, comprising:
input buffers each corresponding to each of said at least one input port and comprising a plurality of input queues, an input write controller for performing write control of the cells into the input queues and an input queue read controller for performing read control of the cells buffered in the input queues according to back-pressures;

output buffers each corresponding to each of said at least one output port and comprising a plurality of output queues, an output queue write controller for performing write control of the cells into the output queues and generating the back-pressures and an output queue read controller for performing read control of the cells buffered in the output queues;

and a switch for switching the cells read out from the input buffers into the output buffers according to header information of the cells;

shapers each accompanying to each of the input queues of each of the input buffers for shifting cells from said each of the input queues to a virtual queue from where the cells are read out by the input queue read controller at a speed obtained by adding a minimum guaranteed speed to a product of rate information designated to said each of the input queues and a number of active VCs (Virtual Channels) assigned to said each of the input queues; and a rate controller for calculating the rate information to be designated for each of the input queues of every of the input buffers according to a function of a sum of queue length of the virtual queue of said each of the input queues of every of the input buffers and a sum of a number of active VCs assigned to said each of the input queues of every of the input buffers.

5. A back-pressure type ATM switch as recited in claim 4; wherein:

the rate information is calculated as zero and the minimum guaranteed speed is defined according to a sum of bandwidths guaranteed to every of the active VCs assigned to said each of the input queues when said each is assigned to a bandwidth guaranteed QoS class.

6. A back-pressure type ATM switch as recited in claim 4, wherein said input queue read controller performs the read control according to rotation priority read-out control and said output queue read controller performs the read control according to fixed priority read-out control.

7. A back-pressure type ATM switch as recited in claim 4; wherein each of the input buffers further comprises:

a back-pressure connector provided to the input queue read controller for defining correspondence between second back-pressures to be referred to by the input queue read controller and the back-pressures generated by the output queue write controller of every of the output buffers.

8. A back-pressure type ATM switch as recited in claim 7; wherein said input queue read controller performs the read control according to rotation priority read-out control and said output queue read controller performs the read control according to fixed priority read-out control.

9. A back-pressure type ATM switch as recited in claim 7; wherein each of the back-pressure generated by the output queue write controller of each of the output buffers is enabled when queue length of each of the output queues of corresponding each of the output buffers is longer than back-pressure threshold length defined to said each of the output queues.

10. A back-pressure type ATM switch as recited in claim 7; wherein read-out of cells from each of the input queues of each of the input buffers is suspended when each of the second back pressures of said each of the input buffers is enabled.

11. A back-pressure type switch, for switching cells supplied from at least one input port to at least one output port, comprising:

a plurality of input ports;

a plurality of input buffers, each input buffer coupled to a respective input port and including a plurality of input queues, an input queue write controller which is effective to control input of the cells into the input queues, and an input queue read controller which is effective to control reading of the cells buffered in the input queues based on back-pressure signals; and a plurality of output ports;

a plurality of output buffers, each output buffer coupled to a respective output port and including a plurality of output queues, an output queue write controller which is effective to control input of the cells into the output queues and to generate the back-pressure signals, and an output queue read controller which is effective to control reading of the cells buffered in the output queues;

a switch which is effective to switch cells read out from the input buffers into the output buffers according to header information of the cells;

each of the input buffers further comprising a resource manager which is effective to perform rejection control of the input queue write controller based on minimum guaranteed resources and a rejection threshold queue length defined for each of the input queues, each of quality of service class virtual resources, and a common resource;

wherein:

the minimum guaranteed resource indicates a buffer space to be used exclusively by respective input queues;

the rejection threshold queue length defined for each of the input queues indicates a maximum allowable queue length of each of the input queues;

the rejection threshold queue length defined for each of quality of service class virtual resources indicates a maximum allowable queue length of each of quality of service class virtual resources, each of the quality of service class virtual resources represents a sum of certain of the input queues which are assigned to each of quality of service classes defining service levels of the back-pressure type switch; and the rejection threshold queue length defined for the common resource indicates a buffer space to be used commonly by each of the input queues.

* * * * *